US012782708B2

(12) United States Patent
Carimati Di Carimate

(10) Patent No.: US 12,782,708 B2
(45) Date of Patent: Nov. 3, 2026

(54) BRIDGE DEVICE FOR IMAGING AND OPTICAL EQUIPMENT

(71) Applicant: Ascanio Carimati Di Carimate, Los Angeles, CA (US)

(72) Inventor: Ascanio Carimati Di Carimate, Los Angeles, CA (US)

(73) Assignee: Rayvn Group LLC, Carlsbad, CA (US)

( * ) Notice: Subject to any disclaimer, the term of this patent is extended or adjusted under 35 U.S.C. 154(b) by 339 days.

(21) Appl. No.: 18/445,465

(22) Filed: Aug. 31, 2023

(65) Prior Publication Data

US 2025/0076633 A1 Mar. 6, 2025

(51) Int. Cl.
*G02B 23/18* (2006.01)
*H04N 23/54* (2023.01)
*H04N 23/55* (2023.01)

(52) U.S. Cl.
CPC ............ *G02B 23/18* (2013.01); *H04N 23/54* (2023.01); *H04N 23/55* (2023.01)

(58) Field of Classification Search
None
See application file for complete search history.

(56) References Cited

U.S. PATENT DOCUMENTS 4,449,787 A * 5/1984 Burbo .................... A42B 3/042 359/410
6,560,029 B1 5/2003 Dobbie et al.
6,662,370 B1 12/2003 Buchanan, Jr.
7,219,370 B1 5/2007 Teetzel et al.
8,531,592 B2 9/2013 Teetzel et al.
11,612,207 B2 3/2023 Teetzel et al.
2008/0184462 A1* 8/2008 Prendergast ......... G02B 23/125 2/410
2022/0326445 A1* 10/2022 Fuller .................... G02B 23/18

FOREIGN PATENT DOCUMENTS

CN 217877349 U * 11/2022

OTHER PUBLICATIONS

Neil A. Dodgson, Variation and extrema of human interpupillary distance, May 2004, Proceedings vol. 5291, Stereoscopic Displays and Virtual Reality Systems XI (Year: 2004).*

* cited by examiner

*Primary Examiner* — Michael H Caley
(74) *Attorney, Agent, or Firm* — Wilkinson Law Office; Clinton H. Wilkinson

(57) ABSTRACT

A bridge device for attachment to a receiving device (mounting assembly) to provide imaging and optical equipment attachment and articulation and to provide interpupillary positioning adjustability and complex movement, including in-sight and out-of-sight movement, and including reciprocal lateral movement from one eye to the other, which bridge device comprises: a central bridge rail with sufficient length for lateral movement of the imaging and optical equipment from one eye to the other eye of a user; a receiving device connector attached to the central bridge rail for connection of the bridge device to the receiving device; at least one pod slideably and lockably attached to the at least one track of the central bridge rail, the pod having the ability to slide along or lock at any position on the track to provide interpupillary positioning adjustability, the pod having a rotational component for attachment and rotation of an auxiliary arm.

24 Claims, 7 Drawing Sheets

BRIDGE DEVICE FOR IMAGING AND OPTICAL EQUIPMENT

BACKGROUND OF INVENTION a. Field of Invention

The present invention pertains to bridge devices designed to connect receiving devices to requisite optical and imaging gear. Herein, "receiving devices" refers to both stationary and mobile apparatuses necessitating attachment to optical and/or imaging systems. Such receiving devices encompass helmets used in military combat, reconnaissance, construction, hiking, climbing, and hunting; weaponry including rifles, bazookas, field cannons, missile systems, and armored fighting vehicles (AFVs); professional tools like surveying equipment, and other devices for laser sighting, imaging, and measurement; as well as multimedia production equipment like cameras, remote digital viewfinders, and similar devices. The term "gear" denotes optical and imaging apparatuses. The term "optical" denotes equipment associated with vision (e.g., scopes, night vision devices) and vision-simulating technologies (e.g., laser designation and infrared guidance). The term "imaging" denotes devices for viewing (e.g., thermal imagers, video displays), tagging, and filming.

Most prior art bridge devices provide both connection and positioning and typically provide flip-up capabilities to provide a sighting position and a stowing position for the optical or imaging device(s). They do not provide for complex motion of the optical and imaging devices or other advantages and options as in the present invention. By using a central rail located above the eye level, with independently slidable and lockable pods, the present invention enables infinite positioning of the pod(s) within the length of the rails on a substantially horizontal path so that a user may move the pods (with their attachments) for optimal positioning. Thus, if one user has a size 6¼ hat size head and another user has a size 9 hat head, each user can move the pod(s) horizontally back and forth (toward and away from head center) to position the imaging and optical devices precisely in front of each eye (ease of centering, and locking in a desired position, to wit, interpupillary positioning adjustability). Additionally, the present invention devices have rotational components on their pods to allow users to fine-tune optical and imaging device positioning and flip up and stow the optical and imaging devices. Further, the present invention provides for interchangeable auxiliary devices-arms that go between the pods and the optical and imaging gear, or alternatively, one or more optical and imaging gear devices are attached directly to a pod. This affords ease of changeability of the end devices (optical and imaging gear) so that the pods and auxiliary arms can accommodate different types and brands of gear, as well as rotate to a stowed position. The term "arm" as used herein is to be taken broadly to connect the end gear to the pod, and the arm need not have an arm shape. Said "arm" can take any form necessary to connect the attachment point of any specific optical or imaging device to the pod and may consist of one or more sections, parts, and adapters. The arm has a proximal end to the pod, the end that connects to the pod, e.g., at a rotational shaft or universal joint, and the arm has a distal end that connects to the gear. By using five components, the central rail, the receiving device connector, the pod, the arm, and the gear, interchangeability and complex movement are provided.

b. Description of Related Art

The following patents are representative of the field pertaining to the present invention:

U.S. Pat. No. 11,612,207 to Teetzel et al. describes a ballistic helmet system having an integrated circuit layer electrically coupled to one or more powered devices, where the ballistic helmet is configured to operate and control the powered devices. The ballistic helmet system comprises a base layer configured to retain the circuit layer. The circuit layer comprises one or more circuit substrates, which may be formed of a flexible material capable of withstanding elevated temperatures that may result from the bonding and curing process of the helmet components.

U.S. Pat. No. 8,531,592 to Teetzel et al. describes a helmet- or head-mounted video recording system that is provided for mounting on a piece of head gear such as a head-protective helmet. The system includes a camera module attachable to the head gear, including a first video camera integrated into the camera module for generating a video signal. A recording module is removably attachable to the head gear and is adapted to receive the video signal and store data representative of the video signal. A power supply module is removably attachable to the head gear and is electrically connectable to the camera module and the recording module.

U.S. Pat. No. 7,219,370 to Teetzel et al. shows pivoting helmet mounts for an optical device. In one aspect, a breakaway connector, which is selectively configurable between breakaway and non-breakaway configurations, is provided. In a further aspect, a strap mount system for securing the helmet mount to the helmet employs a rotating ratchet assembly to adjust the tension in the strap. In another aspect, a helmet mount for an optical device comprises a track assembly attached to a helmet to allow the stowing of the optical device in a further retracted position. The track mount system may further include electrical connectors for attaching a power supply and an electronic device. In another aspect, a mounting bracket allows helmet-mounted optics to be shared with a weapon accessory mount. In a further aspect, an optical sighting device for a weapon combines a reflex sight and a night vision goggle to allow targeting at night or in other low-light conditions.

U.S. Pat. No. 6,662,370 to Buchanan Jr. describes a helmet plate for interfacing between a helmet having a frontally located obstruction and a mount adjustment assembly for a night vision device. The helmet plate is comprised of a support portion having a band and a cavity for overlying the obstruction and an integral power pack housing. The integral power pack housing is disposed in relation to the support portion at such height, depth, and angular position to render a night vision device attached to a mount adjustment assembly, which is secured to the integral power pack housing in the correct viewing position.

U.S. Pat. No. 6,560,029 to Dobbie et al. describes a man-portable video-enhanced night vision goggle comprised of a head mount assembly, an image-intensified video camera, and a display. A thermal camera may also be provided, and the images from the video camera and the thermal camera may be electronically fused on the display.

Notwithstanding the prior art, the present invention is neither taught nor rendered obvious thereby.

SUMMARY OF INVENTION

The present invention is directed to a bridge device for attachment to a receiving device, such as a receiving helmet, weapon or instrument mounting assembly, to provide imaging and optical equipment attachment and articulation and to provide interpupillary positioning adjustability and complex movement for the imaging and optical equipment, including in-sight and out-of-sight movement, and including reciprocal lateral movement from one eye to the other. This present invention bridge device includes a central bridge rail with at least one track, the central bridge rail having a length of at least two inches to provide sufficient distance for lateral movement of the imaging and optical equipment from one eye of a user to the other eye of a user. This track may be a single track or double or more, and may be continuous or broken, and may be a male or a female track for holding the other of a male and female attachable pod or pods, described below.

The present invention bridge device also includes a receiving device connector attached to the central bridge rail for connection of the bridge device to the receiving device. Typically, the receiving device (helmet or otherwise) has a mounting assembly that protrudes out horizontally, and the present invention connector is adapted accordingly, but its angle can be altered or made adjustable to connect with other, differently oriented receiving devices.

The present invention bridge device also includes at least one pod slideably and lockably attached to the at least one track of the central bridge rail. The pod(s) have the ability to slide along or lock at any position on the track to provide interpupillary positioning adjustability for whatever gear is attached, and, when only one pod is present, the pod may be shifted from the left eye to the right eye position and vice versa. Each pod has a rotational component for attachment and rotation of an auxiliary arm. An auxiliary arm is attached to the pod at one end (herein referred to as the proximal end because it is proximal to and rotationally attached to the pod) and is attached at its distal end to one or more gear items, i.e., imaging and optical devices.

In some embodiments of the present invention bridge device, the bridge device components are made of materials selected from the group consisting of metal, plastic, composites, carbon fiber and combinations thereof. Preferred metals are selected from the group consisting of aluminum, stainless steel, titanium, and alloys containing those metals. Each component of the present invention bridge device may be constructed of the same or different materials.

In some embodiments of the bridge device, the at least one track is one of a male and female part of a male and female interconnected slotted track, and the at least one pod is the other of a male and female slotted track. In some embodiments, there are at least two parallel tracks.

In some embodiments of the present invention bridge device, the at least one pod rotational component is a lockable axle for attachment and for rotation of the auxiliary arm in a single plane. In other embodiments, the pod rotational component is a universal joint for attachment and rotation of the auxiliary arm in multiple planes.

In some embodiments of the present invention bridge device, the receiving device connector is selected from the group consisting of a dovetail mount, a screw-on mount, a snap-on mount, a spring mount, a quick-release mount, a fixed mount, and a toggle mount.

In alternative embodiments, the present invention bridge device for attachment to a receiving device, such as a receiving helmet mounting assembly, to provide auxiliary arm attachment and articulation and to provide interpupillary positioning adjustability for the auxiliary arm and the imaging and optical equipment for complex movement, including in-sight and out-of-sight movement, and including reciprocal lateral movement from one eye to the other, includes the components set forth above: the central bridge rail, the receiving device connector, and at least one pod, all as described above, there is also at least one auxiliary arm attached to the at least one pod. The at least one auxiliary arm is rotatably attached to the pod so as to rotate and to include a first portion with a rotational attachment component for attachment to the pod and a second portion with an imaging and optical equipment attachment component for attachment of imaging and optical equipment selected from the group consisting of imaging and optical equipment, and combinations thereof. In some embodiments, the at least one auxiliary arm is selected from the group consisting of an extended arm, a stub arm, and combinations thereof. In some embodiments, the at least one auxiliary arm image and optical equipment attachment component is selected from the group consisting of a screw component, a snap-on component, a slide component, a quick-release component, a spring-lock component, a toggle-lock component, a friction-lock component and combination thereof.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE SEVERAL VIEWS OF THE DRAWINGS(S)

The accompanying drawings, which are included to provide a further understanding of the invention and are incorporated in and constitute a part of this specification, illustrate preferred embodiments of the invention and, together with the detailed description, serve to explain the principles of the invention. In the drawings.

Figure 8:
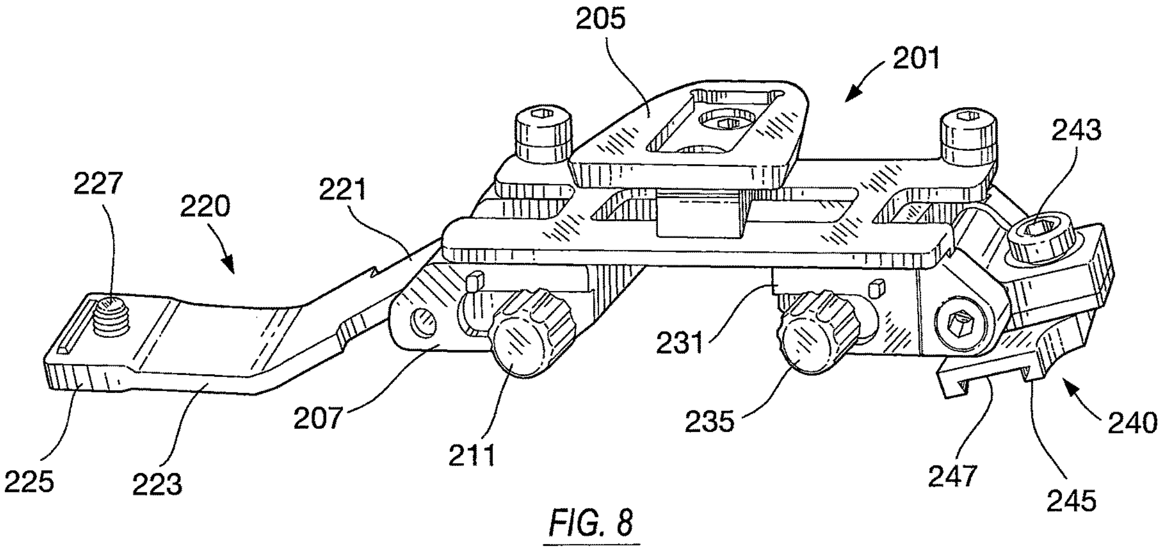
FIGS. 8 and 9 illustrate front oblique views of another present invention bridge device, showing an auxiliary arm in two different positions to illustrate its rotational ability.
Figure 9:
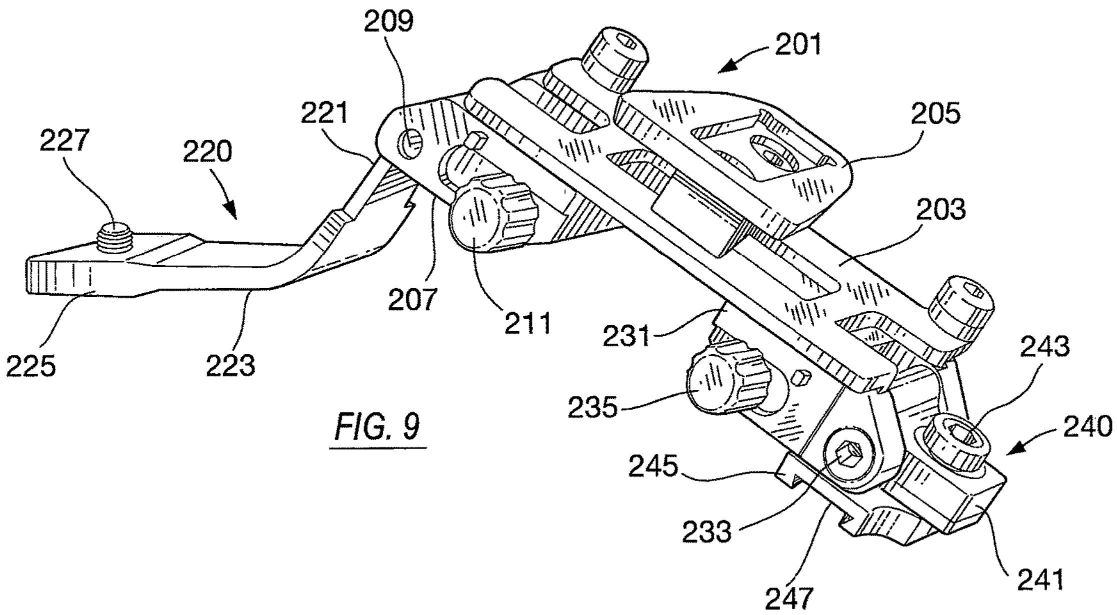
Figure 10:
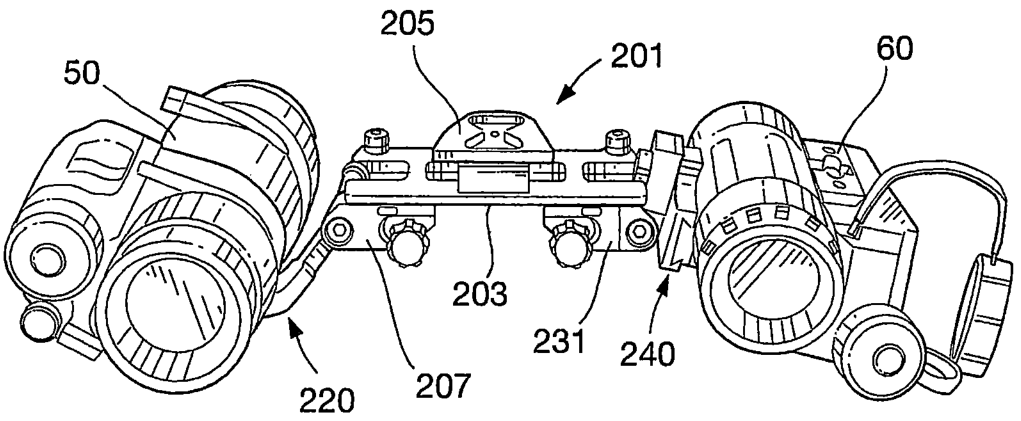
Figure 11:
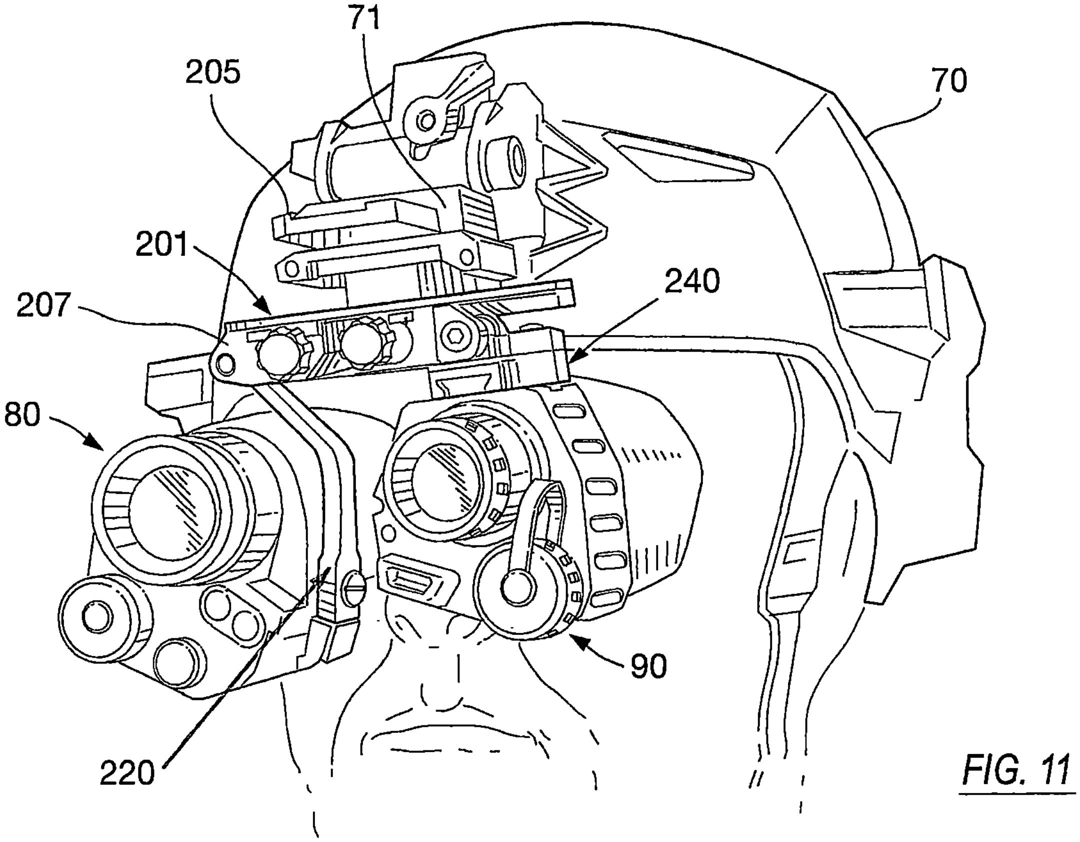

FIG. 10 shows an oblique front view of the present invention bridge device shown in FIGS. 8 and 9, but with an imaging device attached to the auxiliary arm and an optical device attached indirectly to a second pod, both pods being rotated as shown, with the imaging device and optical device in a half way from eyesight position; and, FIG. 11 illustrates the present invention bridge device shown in FIGS. 8, 9, and 10, with an imaging device attached to the auxiliary arm and an optical device attached indirectly to a second pod, and wherein the present invention bridge device connector is attached to a mounting assembly of a special ops helmet.

DETAILED DESCRIPTION OF THE EMBODIMENTS

Figure 1:
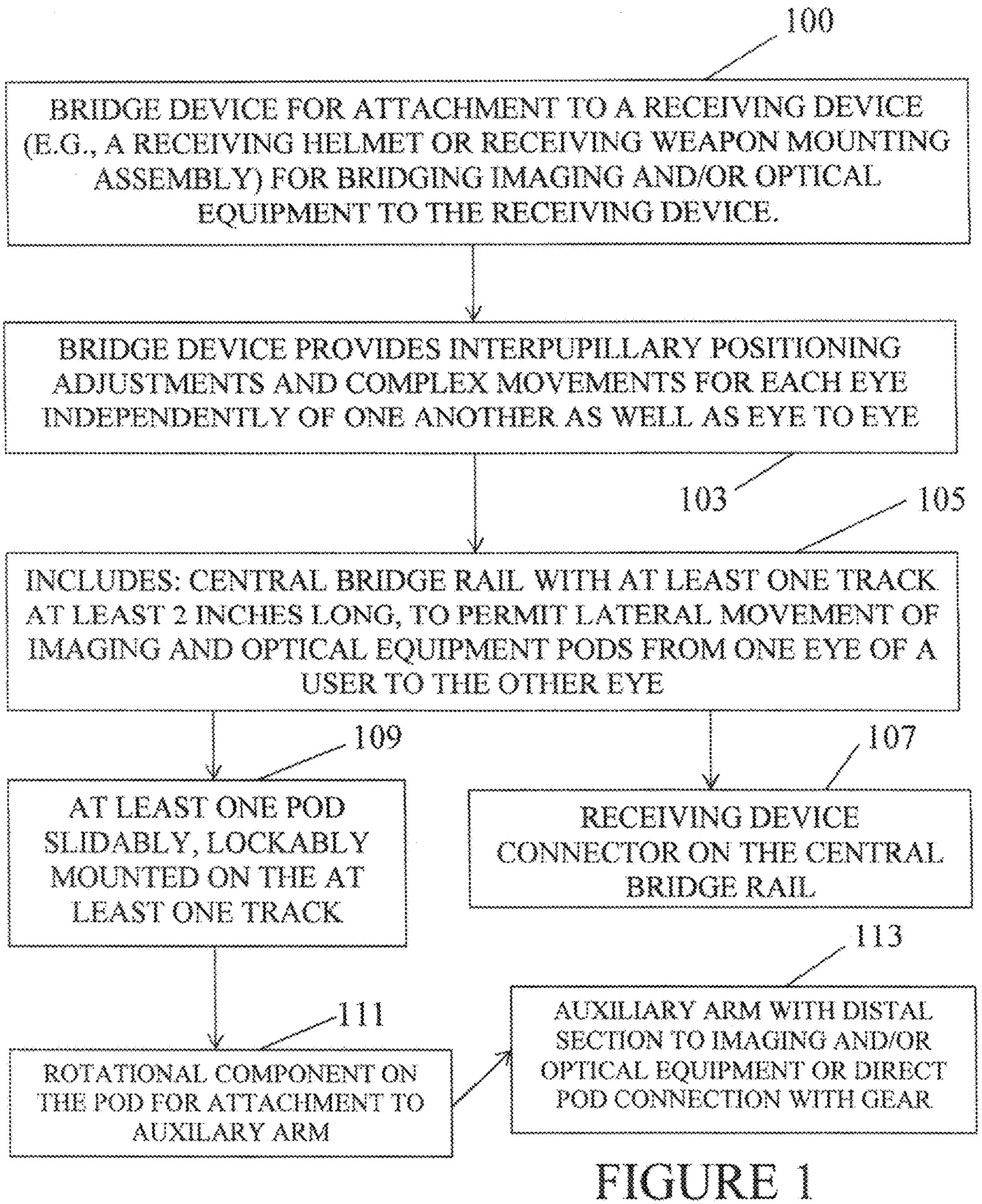
FIG. 1 is a block diagram that presents essential components of the present invention bridge device.

FIG. 1 is a block diagram that presents essential components of the present invention bridge device, block 100. Thus, the present invention bridge device is for attachment to a receiving device, such as a helmet, weapon, or other item, and it is also attached to movable imaging and/or optical equipment. The present invention bridge device essentially mounts the imaging and/or optical equipment in a unique manner to optimize movability, positioning, and function. Block 103, the bridge device provides interpupillary positioning adjustments and complex movements for each eye independently of one another as well as for eye-to-eye movement of the imaging and optical equipment. As indicated in block 105, the present invention bridge device includes a central bridge rail with at least one track at least 2 inches long, and preferably 3 to 5 inches long, or longer, to permit lateral movement of imaging and optical equipment pods from one eye of a user to the other eye. Thus, a single pod may traverse the entire rail and move an item of gear from one eye to the other or may be moved slightly to center the gear with the eye. Likewise, when two pods are used, each may be adjusted for proper eye positioning (centering with the eyes).

The receiving device connector, i.e., the component that attaches the present invention bridge device to the helmet or other receiving device mounting assembly, block 107, is attached to the central bridge rail. It may be mounted at any workable position but is preferably center-mounted atop the central bridge rail. As mentioned, there is at least one pod, block 109, that connects (directly or via an arm) to the imaging and/or optical devices, and the pod is mounted on at least one track of the central bridge rail. The pods have rotational components, block 111, for attachment of an auxiliary arm or for direct connection with gear, block 113. The rotational component is typically an axle or pin but could be any form of universal joint as well. With regard to any attachments described herein, floppy, free movement is undesirable, so some form of built-in or created friction is used, such as tight fits, friction coatings, gaskets, O-rings, washers, ratcheted or grooved connections, swivel or screw locks, etc.

Figure 2:
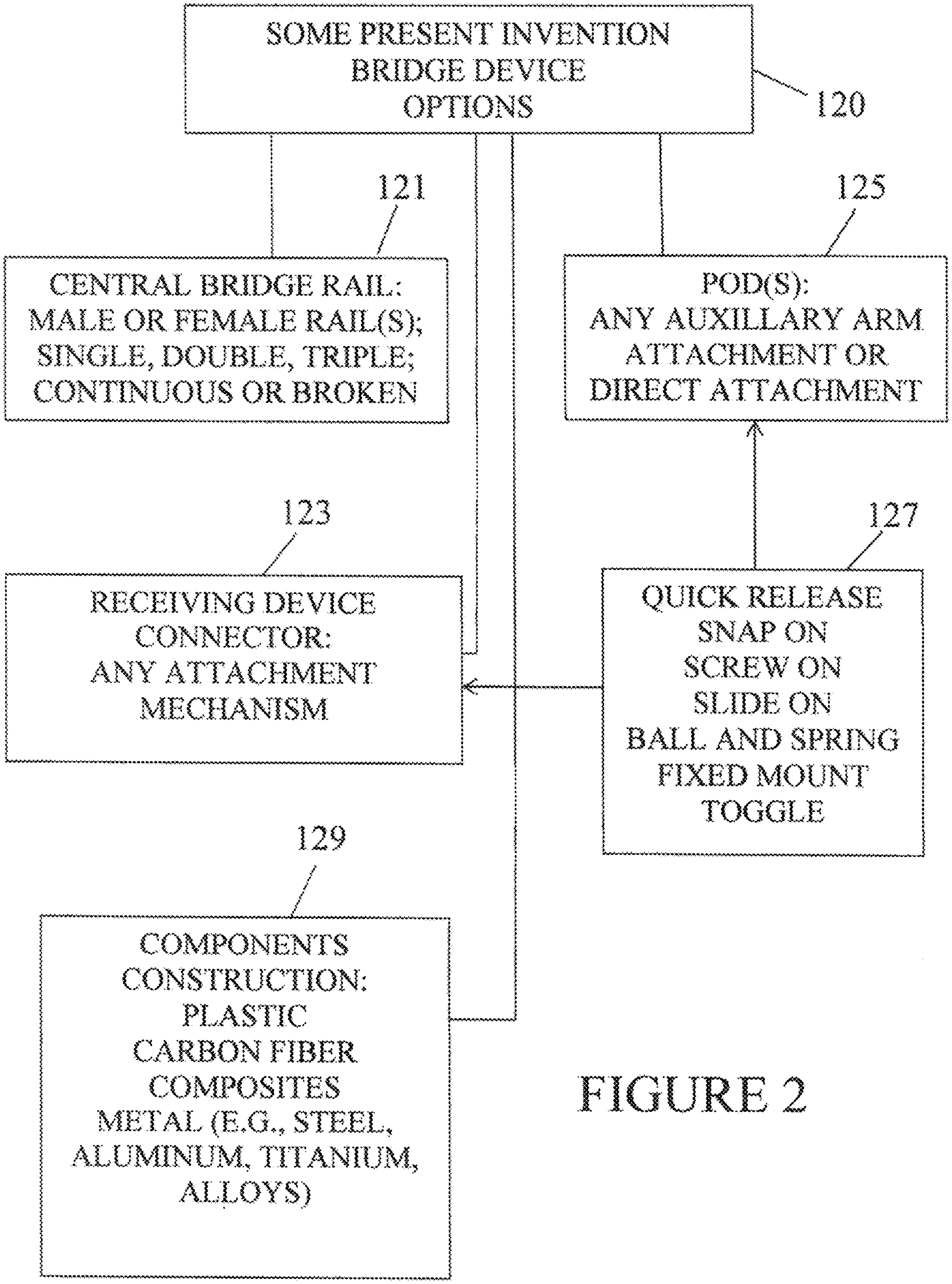
FIG. 2 shows a block diagram that illustrates some detailed alternative options for the components of the present invention bridge device with the central bridge rail, the receiving device connector, and one pod.

FIG. 2 shows a block diagram that illustrates some detailed alternative options for the components of the present invention bridge device, block 120. The central bridge rail, block 121, may be male or female (innie or outie) and may be a single rail or multiple rails; one preferred rail is a wide single male rail, such as shown in the Figures described below. The term “rail” as used herein is equivalent to a track, whereas the term “central bridge rail” is used to refer to the entire block that has one or more rails. A rail may be a protrusion rail or a recessed rail and may be slotted (wider on the inside, such as an inverted T-cutout). Male rails are protrusions shaped so as to keep the pod from disconnecting, such as a solid T or V shape. The receiving device connector, block 123, may have any attachment and is (1) attached to the central bridge rail, e.g., removably attached, such as by screw(s), or permanently attached, such as by unistructurally cast, welded, or otherwise permanently attached to the central bridge rail; and is removably attached (2) to the receiving device, such as a helmet mounting assembly. Block 127 illustrates examples of the types of attachments that may be used for the receiving device connector. The pods, block 125, may have auxiliary arms for gear attachment, or, as mentioned elsewhere herein, there may be a direct connection from the pod to the gear. Block 127 also illustrates examples of the types of attachments that may be used for the direct or indirect pod-to-gear connection.

Figure 3:
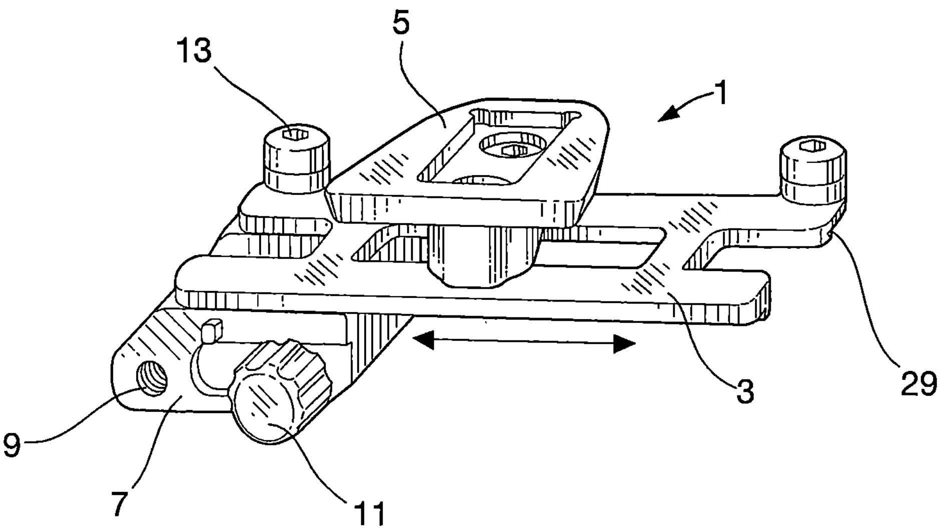
FIG. 3 is a front oblique view of one present invention bridge device with the central bridge rail, the receiving device connector, and one pod.

FIG. 3 is a front oblique view of one present invention bridge device 1, with the central bridge rail 3 with tracks, such as track 29, on the underside. The central bridge rail 3 also had stops at each end to prevent pods from sliding off their rail, once mounted, such as stop screw 13. The receiving device connector 5 is a dovetail connector and is screwed onto the top of the central bridge rail 3. Pod 7 has a track lock screw 11 and a rotational combination screw-axle 9 for an auxiliary arm attachment. The pod may be moved laterally, as shown by the straight arrow of FIG. 3.

The device materials of construction may be any one or more of those described above, but here are aluminum components.

Figure 4:
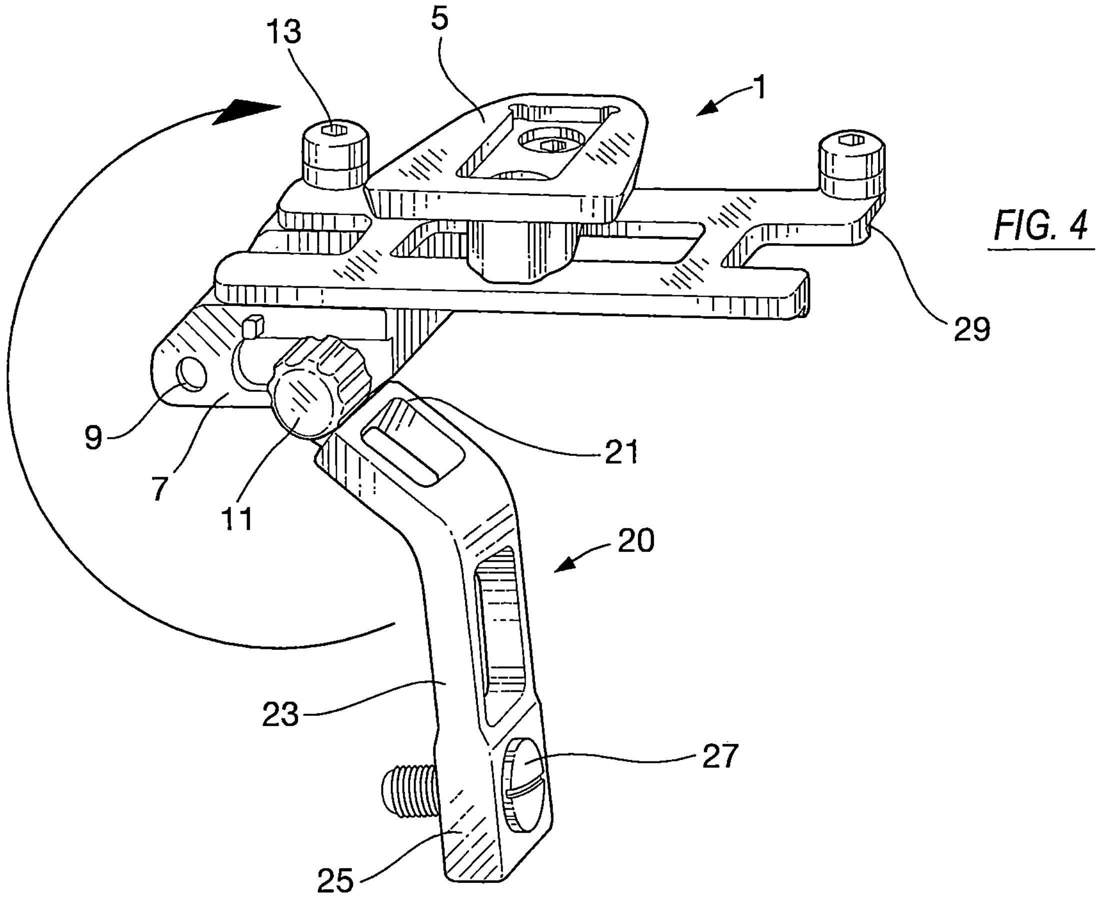
FIG. 4 shows the same present invention bridge device of FIG. 3, but now including one auxiliary arm attached to the pod.

FIG. 4 shows the same present invention bridge device 1 of FIG. 3, but now including one auxiliary arm 20 attached to pod 7. (As to FIGS. 3 through 7, identical parts are identically numbered and, hence, not repeatedly described for each Figure.) Auxiliary arm 20 has a proximal end 21, an elongated central portion 23, and a distal end 25 with an optical or imaging equipment attachment screw 27. Arm 20 is attached to pod 7 at axle 9 at proximal end 21, for rotation thereabout, for positioning in front of an eye, and for flipping or swinging upwardly to a stow position, as shown by the arcuated arrow of FIG. 4.

Figure 5:
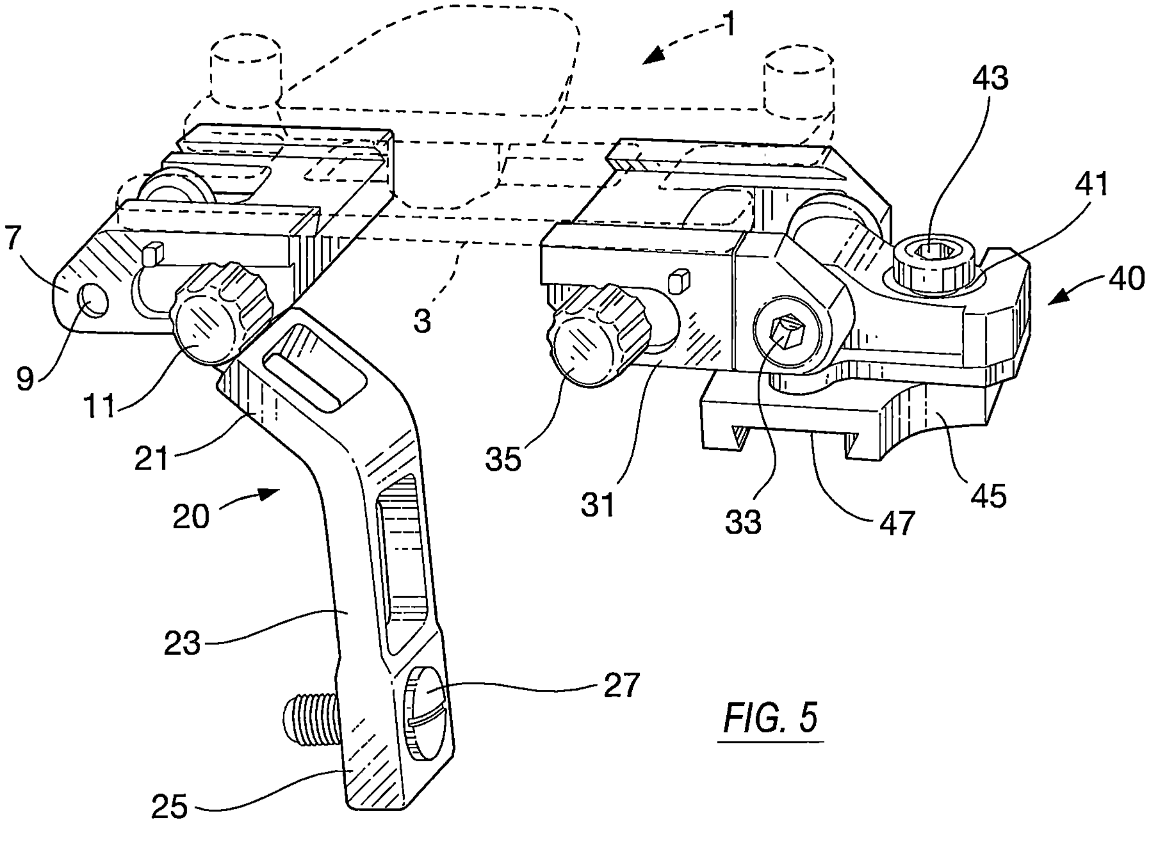
FIG. 5 illustrates the FIG. 4 embodiment, but with the central bridge rail shadowed and with a second pod on the rail.
Figure 6:
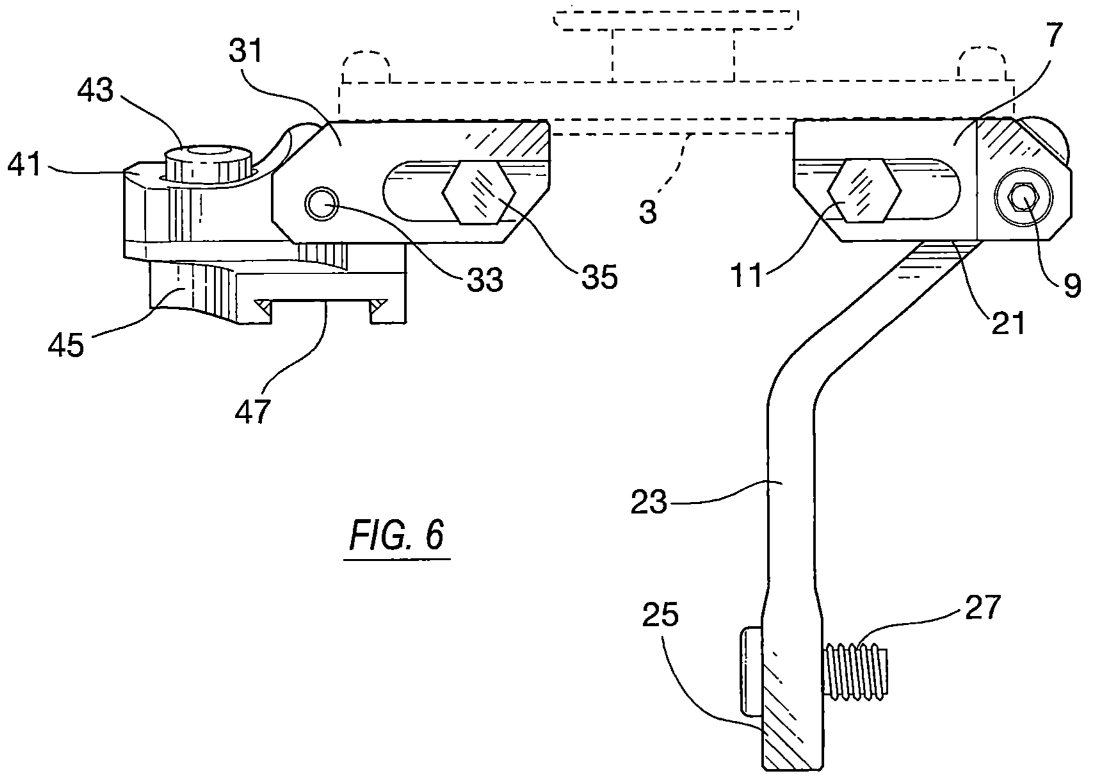
FIG. 6 shows the same embodiment and features of FIG. 5, in a back view.

FIG. 5 illustrates the FIG. 4 embodiment, but with the central bridge rail and connector shadowed and with a second pod 31 on the central bridge rail 3, and FIG. 6 shows the same embodiment and features of FIG. 5, in a back view. In these two Figures, second pod 31 has a rotational axle-screw 33, a track lock screw 35, and a short auxiliary arm 40 rotationally attached to the axle-screw 33. Arm 40 includes a main frame 41, an adapter attachment screw 43 with swivel device-adapter plate 45 containing female device rail attachment point 47 for complex movement of an attachable gear item such as optical or imaging equipment. Gear rail adapter 47 has locking screws to lock onto any mounted gear’s attachment point. In FIG. 6, the back side Figure has been rotated around to expose the other end of the screws and other components. Components of pod 7 and pod 31 are interchangeable so as to be reversible and allow for the mounting of pods and gear on either side of the bridge rail in any direction.

Figure 7:
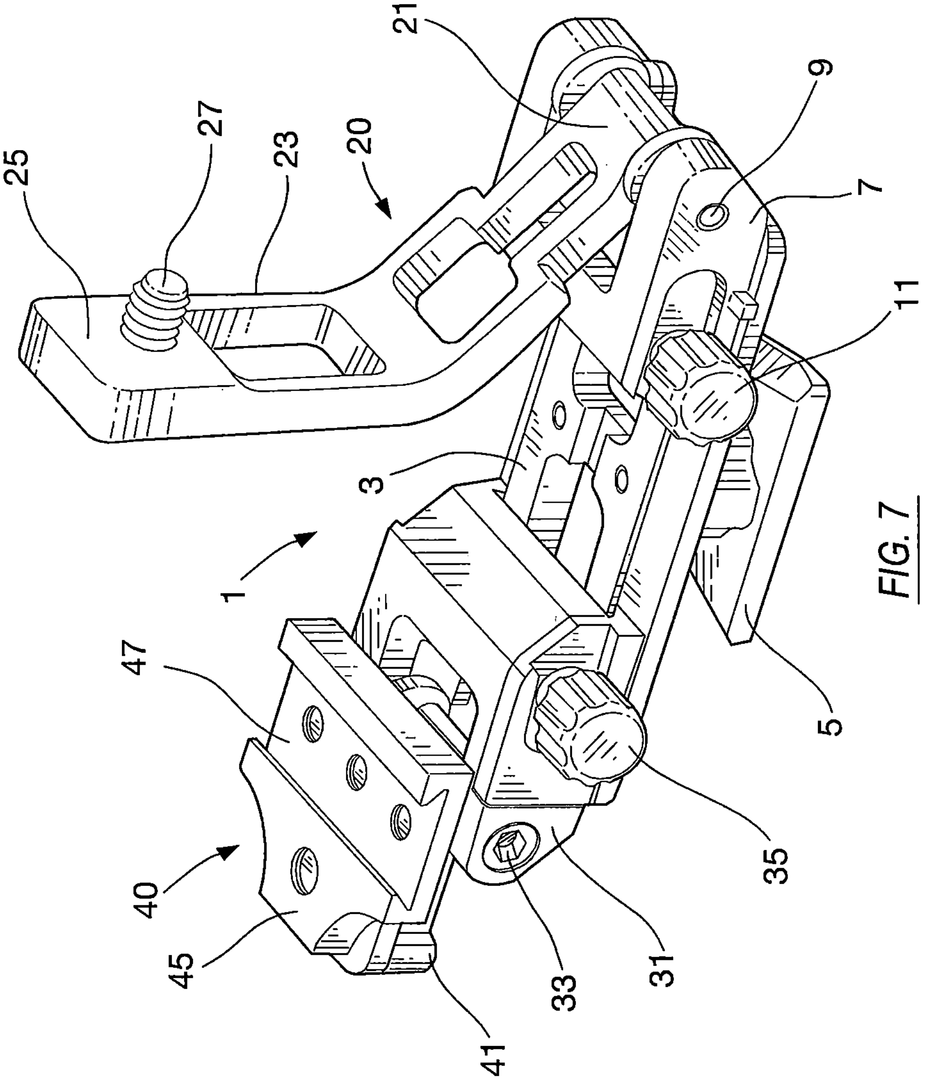
FIG. 7 shows a font-bottom oblique view of the FIGS. 5 and 6 present invention bridge device, except that the central bridge rail is no longer shadowed, and the rotational aspect of the auxiliary arm is exposed and visible.

FIG. 7 shows a back-bottom oblique view of the FIGS. 5 and 6 present invention bridge device 1, except that the central bridge rail 3 and connector 5 are no longer shadowed, and the rotational aspect of the Figure clearly shows the arms connected to their rotational screw-axles.

FIGS. 8 and 9 illustrate front oblique views of another embodiment of the present invention bridge device 201, showing an auxiliary arm 220 in two different positions, respectively, to illustrate its rotational ability, with the central bridge rail 203 with tracks on the underside. The central bridge rail 203 has stops at each end to prevent pods from sliding off their rail, once mounted. The receiving device connector 205 may be any form of connector described herein, and is attached onto the top of the central bridge rail 203, as shown. Pod 207 has a track lock screw 211, and a rotational combination screw-axle 209 for rotational attachment of auxiliary arm 220. Auxiliary arm 220 has a proximal end 221, an elongated central portion 223, and a distal end 225 with gear attachment screw 227. Arm 220 is attached to pod 207 at axle 209 at proximal end 221 for rotation thereabout, for positioning in front of an eye, and for flipping or swinging upwardly to a stowed position. A second pod 231 on the central bridge rail 203 has a rotational axle-screw 233, a track lock screw 235, and a short auxiliary arm 240 rotationally attached to the axle-screw 233. Short auxiliary arm 240 includes a main frame 241, an adapter attachment screw 243 with swivel device-adapter plate 245 containing female device rail attachment point 247 for complex movement of an attachable gear item such as optical or imaging equipment. Gear rail adapter 247 has locking screws to lock onto any mounted gear's attachment point. While pod 231 has additional components attached, alternatively, those components could be integrally formed, such as molded, with the pod and components as a single piece.

FIG. 10 shows an oblique front view of the present invention bridge device 201 shown in FIGS. 8 and 9, but with an imaging device 50 attached to the auxiliary arm 220 and an optical device 60 attached to second pod 231, both pods being rotated as shown, with the imaging device 50 and optical device 60 in a half way from eyesight position. Components of pod 207 and pod 231 are interchangeable so as to be reversible and allow for the mounting of pods and gear on either side of the bridge rail in any direction.

FIG. 11 illustrates the present invention bridge device 201, shown in FIGS. 8, 9, and 10, but now with an imaging device 80 attached to the auxiliary arm 220 and an optical device 90 attached to second pod 231 via short arm 240. Here, the present invention bridge device 201 has its connector 205 attached to a mounting assembly 71 of a special ops helmet 70. Each piece of gear may be adjusted independently for optimal eye positioning, and each piece of gear may be swung up arcuated for stowed-away positioning.

Although particular embodiments of the invention have been described in detail herein with reference to the accompanying drawings, it is to be understood that the invention is not limited to those particular embodiments and that various changes and modifications may be effected therein by one skilled in the art without departing from the scope or spirit of the invention as defined in the appended claims. For example, the actual shape of the central bridge rail, auxiliary arms, pods, receiving device connector, etc., may be any of numerous shape possibilities as long as its functionality as described is not affected adversely.

What is claimed is:

1. A bridge device for attachment to a receiving device to provide auxiliary arm attachment and articulation and to provide interpupillary positioning adjustability for said auxiliary arm and imaging and optical equipment for complex movement, including in-sight and out-of-sight movement, and including reciprocal lateral movement from one eye to the other, which bridge device comprises:

a) a central bridge rail having at least one track extending along a lateral axis, said at least one track being continuous or broken into a plurality of segments aligned along said lateral axis, said central bridge rail having a length of sufficient distance to provide for reciprocal lateral movement of said auxiliary arm and said imaging and optical equipment from one eye of a user to the other eye of the user;

b) a receiving device connector attached to said central bridge rail for removable connection of said bridge device to a receiving device;

c) at least one pod slideably and lockably engaged with said at least one track of said central bridge rail, said at least one pod configured to be repositioned and locked at any user-selected position on said track to provide said interpupillary positioning adjustability, and said pod having a rotational component for attachment of said auxiliary arm thereto and for rotation of said auxiliary arm in a plane transverse to said lateral axis; and, d) at least one said auxiliary arm attached to said at least one pod including a rotational attachment component for attachment to said rotational component of said pod, the auxiliary arm being rotatable relative to the pod between an in-use position and a stowed position, and an imaging and optical equipment attachment component for attachment of imaging and optical equipment and combinations thereof to the auxiliary arm.

2. The bridge device of claim 1 wherein said at least one track is one of a male and female part of a male and female interconnected slotted track, and said at least one pod is the other of a male and female slotted track.

3. The bridge device of claim 2 wherein said at least one track is two tracks and said two tracks are parallel tracks.

4. The bridge device of claim 2 wherein said at least one track is two tracks and said two tracks are parallel tracks.

5. The bridge device of claim 1 wherein said at least one pod rotational component is a lockable axle for tool-less attachment, rotation, and repositioning of said auxiliary arm in a single plane.

6. The bridge device of claim 1 wherein said at least one pod rotational component is a universal joint for tool-less attachment, rotation, and repositioning of said auxiliary arm in multiple planes.

7. The bridge device of claim 1 wherein said receiving device connector is selected from the group consisting of a dovetail mount, a screw-on mount, a snap-on mount, a spring mount, a quick-release mount, a fixed mount, and a toggle mount.

8. The bridge device of claim 1 wherein said bridge device is a bridge device selected from the group consisting of metal, plastic, composites, carbon fiber and combinations thereof.

9. The bridge device of claim 8 wherein said metal is selected from the group consisting of aluminum, stainless steel, titanium and alloys containing those metals.

10. The bridge device of claim 1 wherein said at least one auxiliary arm is removably attached to the pod and is selected from the group consisting of an extended arm, a stub arm and combinations thereof, and wherein said at least one auxiliary arm is interchangeable and can be reconfigured for different devices or setups.

11. The bridge device of claim 1 wherein said at least one auxiliary arm image and optical equipment attachment component is selected from the group consisting of a screw component, a snap-on component, a slide component, a quick-release component, a spring-lock component, a toggle-lock component, a friction-lock component and combination thereof.

12. A bridge device for attachment to a receiving device to provide auxiliary arm attachment and articulation and to provide interpupillary positioning adjustability for said auxiliary arm and imaging and optical equipment for complex movement, including in-sight and out-of-sight movement, and including reciprocal lateral movement from one eye to the other, which bridge device comprises:

a) a central bridge rail with at least one track extending along a lateral axis, said at least one track being either continuous or broken into a plurality of segments, said central bridge rail having a length of sufficient distance to provide for reciprocal lateral movement of said auxiliary arm and precise positioning of said imaging and optical equipment from one eye of a user to the other eye of a user;

b) a receiving device connector attached to said central bridge rail for removable connection of said bridge device to said receiving device;

c) a pair of pods slideably and lockably engaged with said at least one track of said central bridge rail, said pods each configured to independently slide along and lock at any user-selected position on said track to provide said interpupillary positioning adjustability, and each pod having a rotational component for independent attachment and rotation of said auxiliary arm attached thereto in a plane transverse to a lateral axis of the central bridge rail; and, d) a pair of said auxiliary arms each attached to a corresponding one of said pair of pods, each of said pair of auxiliary arms including a rotational attachment component for attachment to said rotational component of said corresponding pod, and being independently rotatable relative to said corresponding pod between an in-use position and a stowed position, and an imaging and optical equipment attachment component to facilitate attachment of single, dual, and mixed imaging and optical equipment configurations to said pair of auxiliary arms.

13. The bridge device of claim 12 wherein said at least one track is one of a male and female part of a male and female interconnected slotted track, and said at least one pod is the other of a male and female slotted track.

14. The bridge device of claim 13 wherein said at least one track is two tracks and said two tracks are parallel tracks.

15. The bridge device of claim 12 wherein said at least one track is two tracks and said two tracks are parallel tracks.

16. The bridge device of claim 12 wherein said at least one pod rotational component is a lockable axle for tool-less attachment, rotation, and locking of said auxiliary arm in a single plane.

17. The bridge device of claim 12 wherein said at least one pod rotational component is a universal joint for tool-less attachment, rotation, and locking of said auxiliary arm in multiple planes.

18. The bridge device of claim 12 wherein said receiving device connector is selected from the group consisting of a dovetail mount, a screw-on mount, a snap-on mount, a spring mount, a quick-release mount, a fixed mount, and a toggle mount.

19. The bridge device of claim 12 wherein said bridge device is a bridge device selected from the group consisting of metal, plastic, composites, carbon fiber and combinations thereof.

20. The bridge device of claim 19 wherein said metal is selected from the group consisting of aluminum, stainless steel, titanium and alloys containing those metals.

21. The bridge device of claim 12 wherein each auxiliary arm is selected from the group consisting of an extended arm, a stub arm and combinations thereof, and wherein said auxiliary arms are interchangeable and can be reconfigured for different devices or setups.

22. The bridge device of claim 12 wherein said auxiliary arm image and optical equipment attachment component is selected from the group consisting of a screw component, a snap-on component, a slide component, a quick-release component, a spring-lock component, a toggle-lock component, a friction-lock component and combination thereof.

23. An imaging and optical equipment helmet mounting system comprising:

a helmet including a helmet mounting assembly;

a bridge device including a central bridge rail having a dovetail helmet mount connector configured for removable connection of the bridge device to the helmet mounting assembly;

at least one track extending along a lateral axis of the central bridge rail, the at least one track being either continuous or broken into a plurality of segments;

a pod slideably and lockably engaged with the at least one track and configured to be repositioned and locked at any user-selected position along the track, and having a rotational component;

an auxiliary arm including a rotational attachment component configured for attachment of the auxiliary arm to the rotational component of the pod, and an imaging and optical equipment attachment component to facilitate attachment of single, dual, and mixed imaging and optical equipment configurations to the auxiliary arm;

wherein the auxiliary arm is rotatable in a plane transverse to the lateral axis of the central bridge rail between an in-use position and a stowed position; and wherein the central bridge rail has a lateral length sufficient to provide for lateral movement of the auxiliary arm and the imaging and optical equipment along the lateral axis of the track from a reciprocal position directly in front of one eye of a user to the other eye of the user, and to provide interpupillary positioning adjustability for the imaging and optical equipment.

24. The system of claim 23 wherein the system is configured for the imaging and optical equipment to be moved out-of-sight both horizontally by sliding the at least one pod laterally on the at least one track and vertically by rotating the auxiliary arm.

* * * * *